May 15, 1962 L. V. GUEST 3,034,795

ADAPTOR FOR USE WITH DISC TALKING MACHINES

Filed Feb. 12, 1959 2 Sheets-Sheet 1

INVENTOR
Laurence V. Guest
BY Ralph B. Stewart
ATTORNEY

May 15, 1962 L. V. GUEST 3,034,795

ADAPTOR FOR USE WITH DISC TALKING MACHINES

Filed Feb. 12, 1959 2 Sheets-Sheet 2

INVENTOR
Lawrence V. Guest
BY Ralph B. Stewart
ATTORNEY 3,034,795
Patented May 15, 1962

3,034,795

ADAPTOR FOR USE WITH DISC TALKING MACHINES

Lawrence Vincent Guest, Old Hill, England, assignor to Birmingham Sound Reproducers Limited, Staffordshire, England Filed Feb. 12, 1959, Ser. No. 792,865
Claims priority, application Great Britain Mar. 5, 1958
7 Claims. (Cl. 274—39)

The present invention relates to an adapter for use with a disc talking machine to enable disc records having central holes of the now common two different sizes to be played on a machine having a turntable spindle of a size intended to receive and centralize records having holes of the smaller size.

It is known to provide adaptors to enable records with holes of the larger size to be played, in the form of, for example, a circular or other plate-like element having an effective diameter such as to be fit in the holes of the larger-holed records, the adaptor being mounted coaxial with the turntable spindle and so as to be movable axially of the turntable spindle between a raised position in which it is above the plane of the record-supporting surface of the turntable in order to be able to centralize a record with a larger hole on the record-supporting surface and a lower position with its upper face in or below that plane so that a record with a smaller hole may be engaged and centralized by the turntable spindle, present day turntables being centrally recessed to accommodate such adaptors in their lower position.

In accordance with the present invention an adaptor is provided comprising a plate-element having a periphery of an effective diameter to engage snugly in the hole of a larger-holed record, a part adapted to be mounted in a position in which it is retained against movement axially of the turntable spindle of a talking machine and spring biasing means acting between said part and the plate-element and adapted to move the plate-element substantially parallel to itself in either direction from a neutral position and with snap or click-stop action between said raised and lower positions spaced axially of the turntable spindle and to retain the plate-element in either of the said two spaced positions.

Stop means may be provided to limit the extent of movement permitted to the plate-element in both the upward and downward directions, the downward movement, however, usually being limited by engagement of the plate-element with the surface of a recessed part of the turntable.

In some cases the adaptor assembly may be a self-contained assembly suitable to be applied in retained position over the normally projecting upper end of the turntable spindle itself whilst in other cases the adaptor assembly may be fixed to the turntable.

Embodiments of the invention are illustrated by way of example in the accompanying drawings in which FIG. 1 is a part-sectional underside plan view of the adaptor in self-contained form suitable to be applied to the turntable spindle of an existing machine embodying a centrally recessed turntable.

Figure 1:
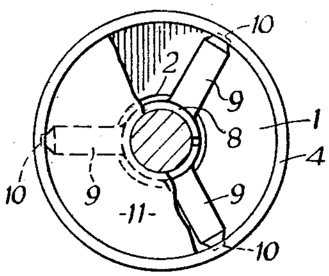
Figure 2:
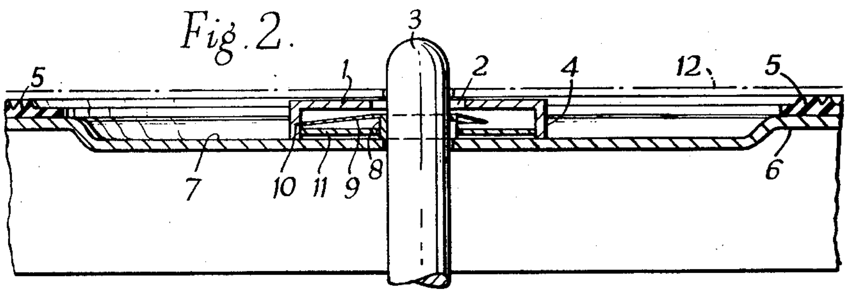
FIGS. 2 and 3 are views in sectional side elevation of part of a turntable with the adaptor applied to the turntable spindle and in the positions corresponding to the playing of small-holed records and large-holed records respectively.
Figure 3:
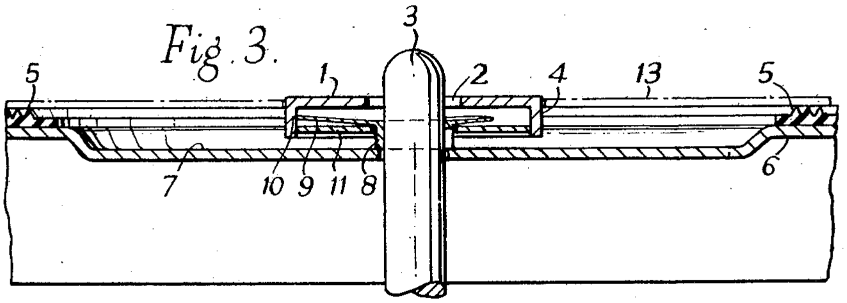

Referring to FIGS. 1 to 3 the adaptor here shown comprises a plate element 1 in the form of a circular disc with a central aperture 2 of a size to engage over the end of a turntable spindle 3 with clearance and a narrow downwardly depending outer edge flange 4 of a depth not greater than the vertical distance between the record supporting surface 5 of the turntable 6 and the bottom of the central recess 7 in the turntable 6. Below the plate element 1 is provided a central sleeve or collar 8 capable of being applied in position over the end of the turntable spindle 3 by forceful hand pressure applied from above the plate-element 1, the sleeve 8 being for example a split sleeve of spring metal.

From the sleeve 8 a number of spring strips 9, say three, extend radially outwards with their free ends engaged in slots or notches 10 in the interior surface of the edge flange 4 of the plate element 1, the length of the spring strips 9 being in excess of the radial distance between the sleeve 8 and the flange 4 so that the springs 9 form what may be termed toggle-springs and are continuously stressed. The springs 9 may be integral with the sleeve 8 as shown and their outer ends may be knife-edged or pointed and the slots or notches 10 in the flange 4 correspondingly formed to provide effective pivots.

A washer 11 is pressed within the flange 4 and below the springs 9 and held in fixed position by engagement with the flange 4.

The adaptor is applied in position by thrusting the sleeve 8 by pressure applied through the plate-element 1, over the end of the turntable spindle 3 to a position in which the upper surface of the plate-element 1 is below the record supporting part 5 of the surface of the turntable 6, the free lower edge of the flange 4 of the plate-element 1 engaging the surface of the recessed part 7 of the turntable 6.

In this position (shown in FIG. 2) the outer ends of the toggle spring strips 9 are below the ends thereof adjacent the sleeve 8 and the spring strips 9 therefore have a downward bias which holds the plate-element 1 in the lowered position of FIG. 2 and records 12 with small holes can be applied over the spindle 3 into the playing position on the surface 5 of the turntable.

To play records 13 (FIG. 3) with larger holes the plate-element 1 is grasped with the tips of the fingers and lifted until the toggle springs 9 take over with an upward bias to complete the lifting movement, the washer 11 engaging the undersides of the springs 9 to determine the fully raised position of the adaptor, as shown in FIG. 3, in which a large-holed record on the surface 5 of the turntable 6 is centralized by engagement of the plate-element 1 in the hole in the record.

The springs 9 retain the plate-element 1 raised until a light downward pressure is exerted with the fingers on the plate-element 1 until the toggle-springs acquire a downward bias and take over to complete the downward movement and thereafter maintain the plate-element 1 lowered.

Figure 4:
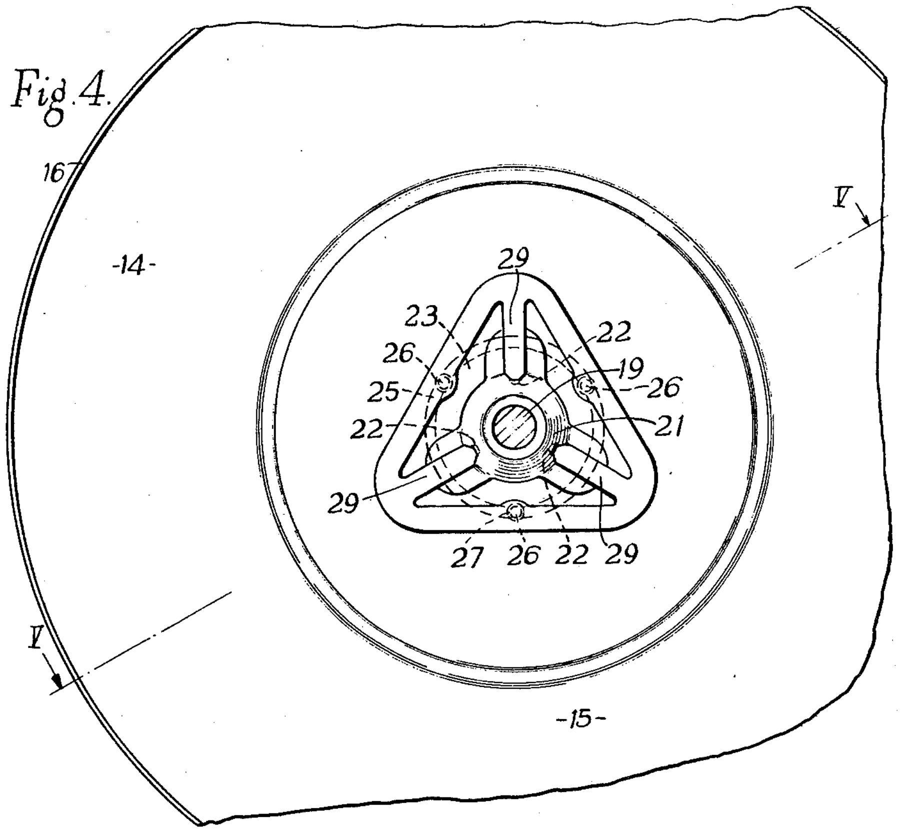
FIG. 4 is an underside plan view of an alternative form of the adaptor embodied in the turntable.
Figure 5:
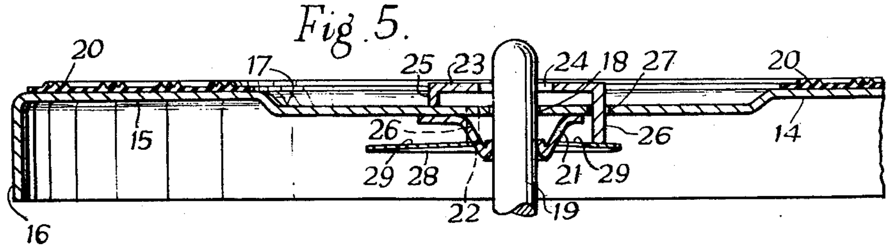
FIGS. 5 and 6 are views in sectional elevation on the line V—V of FIG. 4 showing the adaptor in position for a small-holed record and a large-holed record respectively.
Figure 6:
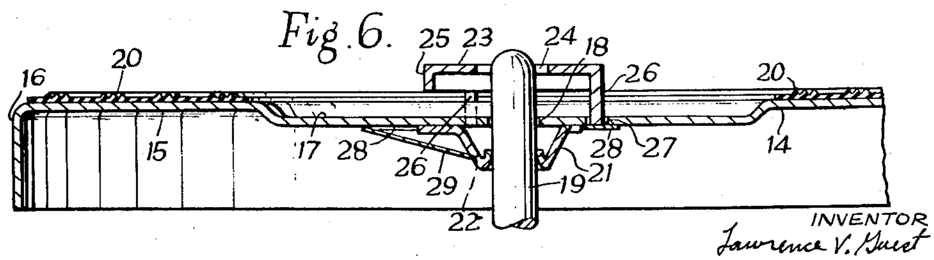

In the alternative construction shown in FIGS. 4 to 6 the adaptor is built into the turntable itself, the anchoring of the fixed ends of the toggle-springs in relation to the turntable spindle being achieved through the engagement of the turntable with the turntable spindle.

In the case shown the turntable body is a sheet metal pressing 14 comprising a circular face-plate 15 and depending edge flange 16, the face-plate being provided with a circular shallow and concentric recess 17, and having a central aperture 18 of a size to pass the end of a normal small-diameter turntable spindle 19, the record supporting surface being formed by the annular portion of the face-plate 15 surrounding the recess 17 and usually being covered by a mat 20 of rubber or the like.

To the centre of the underside of the recessed portion 17 of the turntable is affixed a centrally apertured hollow boss 21, the central aperture in the boss being of a size to be a frictional fit over the end of a small-diameter turntable spindle.

In the wall of the hollow boss or collar 21 are formed a number, e.g. three, of slots or notches 22 uniformly distributed about the axis of the boss.

An adaptor proper of a size to fit the aperture of a large-apertured record is provided in the form of a flat plate-element 23 with a central aperture 24 of a size affording clearance over the spindle 19, and a narrow edge flange 25. This plate-element 23 with the flange 25 depending is located concentrically over the turntable 14 and a number, three in the case shown, of uniformly distributed pillars 26 provided on the depending edge flange 25 extend downwards and through apertures 27 formed through the bottom of the recessed portion 17 of the turntable body.

At the underside of the recessed part 17 of the turntable body 14 is provided a flexible spring member shown in the form of a thin plate 28 of metal or plastic of hollow equilateral triangular contour with flexible spring arms 29 extending from each angle or corner of the triangle towards the centre thereof.

The lower ends of the three pillars 26 on the edge flange 25 of the plate-element 23 are connected with the centres of the three sides of the triangular flexible spring member 28.

The free ends of the inwardly extending flexible spring arms 29 of the flexible member 28 are tapered and make abutting and locating engagement one in each of the three distributed slots or notches 22 in the wall of the central hollow boss 21 fixed to the underside of the turntable 14, and the length of the arms 29 is in excess of the radial distance between an angle of the triangular plate 28 and the related slot or notch 22 in the wall of the central boss 21. Thus with the triangular portion of the flexible plate 28 located at one side or the other of the plane containing the slots or notches 22, the spring arms 29 are necessarily bent from the plane of the triangular portion and they constitute toggle-springs biased in the direction tending to maintain the position of the triangular flexible member 28.

The dimensions are such that with the triangular plate 28 in contact with the underside of the recessed part 17 of the turntable the plate-element 23 secured thereto is in its raised position for use with a large-apertured record, i.e., in the position in which it extends above the plane of the record-supporting surface 20 of the turntable as shown in FIG. 6, and the flexible spring arms 28 are extending at a general upward inclination to the axis of the central boss 21 and of the turntable spindle 19 to maintain the triangular part of the flexible member 28 and the plate-element 23 in this position, i.e. an upper position of stable equilibrium.

To move the plate-element 23 to the lower or inoperative position it is merely necessary to press downwards lightly upon the plate-element to depress the flexible member 28. This movement deforms the flexible spring arms 29 with parts of the flexible triangular portion itself, until the direction of the inclination of the arms 29 with reference to the axis of the hollow central boss 21 and of the turntable spindle 19 is reversed. Thereupon the triangular portion of the flexible member 28 and the plate-element 23 are moved downwards with a snap or click-stop action by the recovery of the flexible spring arms 29, the movement being terminated by engagement of the edge of the flange 25 of the plate-element 23 with the upper surface of the recessed portion 17 of the turntable 14. Thereafter the plate-element 23 is retained in this position i.e. a lower position of stable equilibrium, by the flexible spring arms 29.

To return the plate-element 23 to its operative raised position it is merely necessary to commence a lifting movement of the plate-element 23 with the finger tips, whereupon the flexible spring arms 29 of the flexible spring member 28 again reverse to move the parts into and retain them in the upper position of stable equilibrium.

The flange 25 of the plate-element 23 may be notched or slotted for engagement by the finger nails to facilitate the initial lifting movement.

I claim:

1. An adaptor for use with a disc talking machine to enable records having central holes of different sizes to be played on a machine having a turntable and a turntable spindle of a size to receive and centralize records having holes of the smaller size, said adaptor comprising a plate-element having a periphery of an effective diameter to engage snugly in the hole of a larger-holed record and a central aperture through which the spindle may project, a spindle extending through the central aperture of said plate, a collar carried by said spindle below said plate and toggle-spring means connected between said plate element and collar for supporting said plate element from said collar and for spring biasing said plate element into either of two positions of different elevations.

2. An adaptor for use with a disc talking machine to enable records having central holes of different sizes to be played on a machine having a turntable and a turntable spindle of a size to receive and centralize records having holes of the smaller size, said adaptor comprising a plate-element having a periphery of an effective diameter to engage snugly in the holes of a larger-holed record, a sleeve adapted for frictional retaining engagement on the said turntable spindle, and toggle-spring means connected between said sleeve and a peripheral portion of said plate-element and acting to move the plate-element substantially parallel to itself in either direction from a neutral position and with snap action into either of two separate positions spaced axially of the turntable spindle and retaining the plate-element in either of the said two separate spaced positions.

3. An adaptor as claimed in claim 2 wherein the plate-element is formed with a downward projection at the edge of its periphery and the toggle-spring means is formed by arms extending radially of the turntable spindle and each anchored at one end to said sleeve on the turntable spindle and engaged at the other ends in notches in the said downward projection, the effective length of the spring arms in an unstressed condition being greater than the distance between the said sleeve and the said downward projection on the plate-element.

4. An adaptor as claimed in claim 3 wherein stop means are provided, fixed in relation to the downward projection on the plate-element and engaging with the said spring arms at the side thereof remote from the plate-element and limiting the movement of the plate-element in one direction axially of the turntable spindle.

5. An adaptor as claimed in claim 2 wherein the plate-element is formed with a downward projection at the edge of its periphery and extending into a recess in the upper side of the turntable and the toggle-spring means is formed by spring arms located between the plate-element and the turntable and extending radially of the turntable spindle and each arm being anchored at one end to said sleeve on the turntable spindle and engaged at the other ends in notches in the said downward projection, the effective length of the spring arms in an unstressed condition being greater than the distance between the said sleeve and the said downward projection on the plate-element.

6. A disc talking machine turntable embodying an adaptor to enable records having central holes of different sizes to be played on a machine having a turntable spindle of a size to receive and centralize records having holes of the smaller size and comprising a turntable having an apertured recess in its upper surface, a central hollow boss fixed to the underside of said turntable and surrounding said spindle, a plate-element located over the recess in said turntable and having a periphery of an effective diameter to engage snugly in the hole of a larger-holed record, a plurality of downwardly extending projections on the peripheral portion of said plate-element and extending through apertures in the central recess portion of said turntable, and toggle-spring means beneath said turntable and acting between said boss and said downward projections on said plate-element and acting to move said plate-element substantially parallel to itself in either direction from a neutral position and with snap action into two separate positions, one within said recess and one above the plane of the surface of the turntable surrounding the recess and retaining the plate-element in either of the said two separate positions.

7. A turntable as claimed in claim 6 wherein said toggle-spring means is formed by a plurality of spring arms extending radially outwards from the said boss beneath the turntable, a plurality of flexible connection members integral with and each connecting the radially outer free ends of an adjacent pair of the said spring arms, said connecting members being each connected at points intermediate the outer ends of the related pair of adjacent spring arms to one of the said plurality of downwardly extending projections on said plate element.

References Cited in the file of this patent

UNITED STATES PATENTS

| | | |
|---|---|---|
| 2,693,364 | Chalfin | Nov. 2, 1954 |
| 2,762,627 | Johnson | Sept. 11, 1956 |
| 2,799,509 | Thomas | July 16, 1957 |
| 2,838,315 | Staar | June 10, 1958 |